३,८०१,६४७
NITRO DERIVATIVES OF ISOPROPENYL-CARBORANE

William E. Hill, Huntsville, Ala., assignor to the United States of America as represented by the Secretary of the Army
No Drawing. Filed Feb. 5, 1969, Ser. No. 798,269
Int. Cl. C07d 105/02
U.S. Cl. 260—606.5 B                    6 Claims

ABSTRACT OF THE DISCLOSURE

The olefinic carborane, isopropenylcarborane, is reacted with $N_2O_4$ in an ether solvent to yield products useful as burning rate catalyst for double-base propellants.

BACKGROUND OF THE INVENTION

Prior art experimentation with reactions of vinyl groups adjacent to a carborane nucleus has indicated that the alkenyl group can be hydrogenated and also that oxidation can be achieved though the product was not identified. The prior art has also shown that reactions under electrophilic conditions with respect to 1-isopropenylcarborane have been unsuccessful. Generally, the results indicate that the carborane compound is confirmed to show an unreactive nature toward ionic additions.

The present invention has as its principal object to modify 1-isopropenylcarborane by radical additions to the alkenyl group.

A particular object is to provide a simple process to accomplished radical addition of the nitro group to the alkenyl group of 1-isopropenylcarborane, A further object is to provide a nitro derivative of 1-isopropenylcarborane which increases the burning rate when used with solid double-base propellant compositions.

SUMMARY OF THE INVENTION

Dinitrogen tetroxide is reacted with 1-isopropenylcarborane to accomplish radical addition of the nitro group to the alkenyl group of the 1-isopropenylcarborane. The utility of the nitrocarborane compound is illustrated by testing in a solid double-base propellant composition.

DESCRIPTION OF THE PREFERRED EMBODIMENTS 1-isopropenylcarborane is modified by nitro radical addition to yield the following preferred compound:

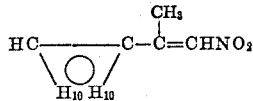

The chemical recation for the formation of the above compound, useful in propellant compositions to provide ultra high burning rates, is set forth hereinbelow. The amount of the preferred compound for use in double-base propellant compositions is from about 10 to about 25 weight percent. Where only smaller burning rate increases are desired, amounts of catalyst in the range of 5 percent produce satisfactory results.

Two derivatives of 1-isopropenylcarborane are prepared in accordance with this invention by the following procedure:

EXAMPLE I

A 1 liter stainless steel Hoke bomb is charged with a solution of 1-isopropenylcarborane (0.217 mole) in 300 milliliters of diethyl ether. The bomb is cooled to $-80°$ C., evacuated, and charged with dinitrogen tetroxide (0.313 mole). The reaction is shaken at room temperature for 12 hours. Excess dinitrogen tetroxide is removed in vacuo. The reaction mixture is quenched in aqueous sodium bicarbonate. The organic layer is separated, dried over magnesium sulfate and the solvent is then removed by distillation. The oily residue is chromatographed over silica gel to give 1-nitro-2-(1-carboranyl) propene, M.P. 73.5° C., as a light green solid in 35% yield. The other component formed in the reaction (in about 65% yield) is described hereinbelow.

The proton nuclear magnetic resonance (NMR) shows three absorptions centered at 2.25 p.p.m., 3.90 p.p.m. and 7.25 p.p.m., respectively. The absorption due to the methyl group at 2.25 p.p.m. is split into a doublet (J.=2 c.p.s.) by the vinylic proton. The 3.90 p.p.m. absorption due to the C—H on the carboranyl cage is a very broad singlet. The absorption due to the vinylic proton centered at 7.25 p.p.m. is a quartet (J.=2 c.p.s.) due to the interaction of the methyl protons. The infrared spectrum of the solid in liquid petrolatum (e.g., Nujol) shows an absorption of 1640 cm.$^{-1}$ due to the C=C stretching vibration and bands characteristic of a nitro group.

1-nitro-2-(1-carboranyl)-2-hydroxypropane (Compound IV), a light yellow solid, M.P. 103° C. was obtained in 65% yield. The proton NMR shows four absorptions centered at 1.35 p.p.m., 1.63 p.p.m., 3.95 p.p.m., and 4.67 p.p.m. The absorption at 1.35 p.p.m. due to the hydroxyl proton is a solvent and concentration dependent singlet. All other absorptions are also singlets. The 1.63 p.p.m. absorption is due to the methyl group and the 4.67 p.p.m. absorption to the vinylic proton. The 3.95 p.p.m. absorption is very broad and is assigned to the C—H on the carboranyl cage. The infrared spectrum confirms the presence of hydroxyl and nitro groups.

EXAMPLE II

Ten grams of isopropenylcarborane and 250 milliliters of diethyl ether are placed into a three necked flask and allowed to react with slight stoichiometric excess of $N_2O_4$ at room temperature. After 2 hours the reaction is quenched with aqueous sodium bicarbonate. The organic layer (diethyl ether containing the derivatives) is separated, dried over magnesium sulfate, and the diethyl ether solvent is then removed by distillation. The crude dark green oil is chromatographed on silica gel to give Compound III 40% (a light green solid) and Compound IV 60% (a light yellow solid). The structure of Compounds III and IV are set forth hereinbelow.

The chemical reaction for the formation of the above noted compounds is represented by the following illustrations:

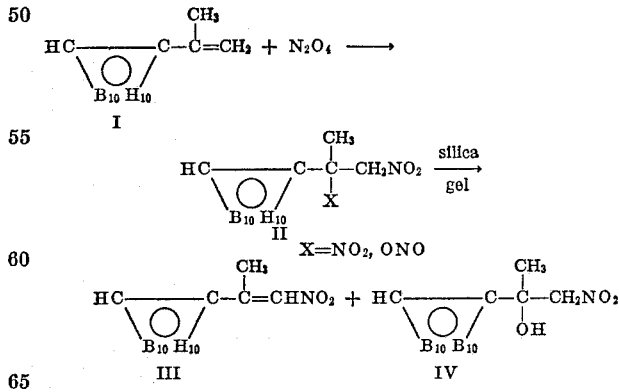

The Compound II, containing the nitro nitrite, is converted to the nitro alcohol IV. The Compound II, containing the two nitro groups, is converted to nitro olefin III. Additional proof for composition of III and IV is as follows:

Analysis (III).—Calculated (percent): C, 26.1; H, 6.55; N, 6.11. Found (percent): C, 26.2; H, 6.66; N, 6.19.

Analysis (IV).—Calculated (percent): C, 24.29; H, 6.48; N, 5.68. Found (percent): C, 24.30; H, 6.88; N, 5.68.

Testing of (III) in double-base propellants gave burning rate as follows:

| Weight percent catalyst: | Rate (2000 p.s.i.) in./sec. |
|---|---|
| 0 | 1.44 |
| 21.2 | 4.48 |
| 24.8 | 4.67 |
| 11.2 | 2.81 |

The nitro alcohol (IV) is not compatible with nitrocellulose. Although the catalytic value is present in Compound IV, the use of Compound IV in a stable double-base propellant composition offers certain disadvantages due to its incompatibility with the nitrocellulose. Compound IV is compatible for use in composite propellant formulations.

I claim:

1. A process of producing derivatives of 1-isopropenylcarborane comprising reacting 1-isopropenylcarborane in diethyl ether with a slight stoichiometric excess of dinitrogen tetroxide in a reaction mixture to form derivatives of 1-isopropenylcarborane; quenching said reaction mixture with aqueous sodium bicarbonate; separating the diethyl ether layer and the said derivatives contained therein from the quenched reaction mixture; drying said ether layer containing said derivatives over magnesium sulfate; distilling the diethyl ether from said derivatives; and chromatographing said derivatives over silica gel to effect a separation of the two compounds comprising the said derivatives to yield 1-nitro-2-(1-carboranyl) propene and 1-nitro-2-hydroxy-2-(1-carboranyl) propane.

2. The process of claim 1 and wherein said derivatives are comprised of 1-nitro-2-(1-carboranyl)propene in the amount of about 35 to 40 percent by weight of 1-nitro-2-hydroxy-2-(1-carboranyl)propane in the amount of about 60 to 65 percent by weight.

3. The process of claim 1 wherein prior to said quenching, the excess dinitrogen tetroxide is removed.

4. A compound selected from the group consisting of 1-nitro-2-(1-carboranyl) propene and 1-nitro-2-(1-carboranyl)-2-hydroxypropane.

5. A compound as set forth in claim 4 wherein said compound is 1-nitro-2-(1-carboranyl) propane.

6. A compound as set forth in claim 4 wherein said compound is 1-nitro-2-(1-carboranyl)-2-hydroxypropane.

References Cited

UNITED STATES PATENTS

| 3,035,101 | 5/1962 | Seifert et al. | 260—644 |
| 3,254,117 | 5/1966 | Dupont et al. | 260—606.5 X |
| 3,505,409 | 4/1970 | Bobinski et al. | 260—606.5 |

CARL D. QUARFORTH, Primary Examiner

E. A. MILLER, Assistant Examiner

U.S. Cl. X.R.

149—22